US008331953B2

(12) United States Patent
Carlson et al.

(10) Patent No.: US 8,331,953 B2
(45) Date of Patent: Dec. 11, 2012

(54) SYSTEM AND METHOD FOR ESTIMATING THE LOCATION OF A MOBILE DEVICE

(75) Inventors: John Carlson, Dulles, VA (US); Martin Alles, Vienna, VA (US)

(73) Assignee: Andrew LLC, Hickory, NC (US)

( * ) Notice: Subject to any disclaimer, the term of this patent is extended or adjusted under 35 U.S.C. 154(b) by 1369 days.

(21) Appl. No.: 11/743,139

(22) Filed: May 1, 2007

(65) Prior Publication Data

US 2008/0274750 A1 Nov. 6, 2008

(51) Int. Cl.
*H04W 24/00* (2009.01)
(52) U.S. Cl. .................................. 455/456.1; 455/456.6
(58) Field of Classification Search ............... 455/456.1, 455/456.6
See application file for complete search history.

(56) References Cited

U.S. PATENT DOCUMENTS

| | | | |
|---|---|---|---|
| 4,728,959 A | 3/1988 | Maloney | |
| 5,327,144 A | 7/1994 | Stilp et al. | |
| 5,608,410 A | 3/1997 | Stilp et al. | |
| 5,959,580 A | 9/1999 | Maloney et al. | |
| 6,047,192 A | 4/2000 | Maloney | |
| 6,091,362 A | 7/2000 | Stilp | |
| 6,097,336 A | 8/2000 | Stilp | |
| 6,101,178 A | 8/2000 | Beal | |
| 6,108,555 A | 8/2000 | Maloney et al. | |
| 6,115,599 A | 9/2000 | Stilp | |
| 6,119,013 A | 9/2000 | Maloney et al. | |
| 6,127,975 A | 10/2000 | Maloney | |
| 6,172,644 B1 | 1/2001 | Stilp | |
| 6,184,829 B1 | 2/2001 | Stilp | |
| 6,204,812 B1 | 3/2001 | Fattouche | |
| 6,266,013 B1 | 7/2001 | Stilp et al. | |
| 6,281,834 B1 | 8/2001 | Stilp | |
| 6,285,321 B1 | 9/2001 | Stilp et al. | |

(Continued)

FOREIGN PATENT DOCUMENTS

WO 97/23785 A1 7/1997

(Continued)

OTHER PUBLICATIONS

International Searching Authority, International Search Report for Related International Application No. PCT/US08/60119, mailed Jun. 30, 2008, p. 1-3.

(Continued)

*Primary Examiner* — Patrick Edouard
*Assistant Examiner* — Michael Irace
(74) *Attorney, Agent, or Firm* — Duane Morris LLP

(57) ABSTRACT

A system and method for estimating the location of a mobile station that receives signals from a plurality of base stations. The base station timing offsets may be estimated utilizing an observed time difference of arrival value at the mobile between a first signal received from a first base station and a second signal received from a second base station. An initial location for the mobile is randomly selected and an estimated location is determined using the selected initial location, the observed time difference of arrival value, and an iterative search algorithm. The estimated location may be stored if the estimated location is within a predetermined area. In addition, for each such estimated location, the applicable base station time offsets that relate to this location may be updated to generate a current best estimate. A calculated location for the mobile may be determined from stored estimated locations and the current base station time offset estimates.

47 Claims, 7 Drawing Sheets

U.S. PATENT DOCUMENTS

| | | | |
|---|---|---|---|
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,400,320 B1 | 6/2002 | Stilp et al. | |
| 6,463,290 B1 | 10/2002 | Stilp et al. | |
| 6,483,460 B2 | 11/2002 | Stilp et al. | |
| 6,492,944 B1 | 12/2002 | Stilp | |
| 6,519,465 B2 | 2/2003 | Stilp et al. | |
| 6,546,256 B1 | 4/2003 | Maloney | |
| 6,563,460 B2 | 5/2003 | Stilp et al. | |
| 6,603,428 B2 | 8/2003 | Stilp | |
| 6,646,604 B2 | 11/2003 | Anderson | |
| 6,661,379 B2 | 12/2003 | Stilp et al. | |
| 6,765,531 B2 | 7/2004 | Anderson | |
| 6,771,625 B1 | 8/2004 | Beal | |
| 6,782,264 B2 | 8/2004 | Anderson | |
| 6,873,290 B2 | 3/2005 | Anderson et al. | |
| 6,876,859 B2 | 4/2005 | Anderson et al. | |
| 6,996,392 B2 | 2/2006 | Anderson | |
| 7,023,383 B2 | 4/2006 | Stilp et al. | |
| 7,167,713 B2 | 1/2007 | Anderson | |
| 7,271,765 B2 | 9/2007 | Stilp et al. | |
| 7,340,259 B2 | 3/2008 | Maloney | |
| 7,427,952 B2 | 9/2008 | Bull et al. | |
| 7,440,762 B2 | 10/2008 | Maloney et al. | |
| 7,593,738 B2 | 9/2009 | Anderson | |
| 2001/0004601 A1* | 6/2001 | Drane et al. | 455/456 |
| 2002/0172223 A1 | 11/2002 | Stilp et al. | |
| 2003/0064734 A1 | 4/2003 | Stilp et al. | |
| 2004/0002344 A1* | 1/2004 | Moeglein et al. | 455/456.1 |
| 2004/0203904 A1* | 10/2004 | Gwon et al. | 455/456.1 |
| 2005/0192745 A1* | 9/2005 | Abraham et al. | 701/213 |
| 2006/0003775 A1 | 1/2006 | Bull et al. | |
| 2006/0030333 A1 | 2/2006 | Ward et al. | |
| 2006/0276201 A1* | 12/2006 | Dupray | 455/456.1 |
| 2007/0049286 A1 | 3/2007 | Kim et al. | |
| 2007/0111746 A1 | 5/2007 | Anderson et al. | |
| 2007/0155401 A1 | 7/2007 | Ward et al. | |
| 2007/0155489 A1 | 7/2007 | Beckley et al. | |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2008/0287116 A1* | 11/2008 | Drane et al. | 455/423 |
| 2009/0005061 A1 | 1/2009 | Ward et al. | |

FOREIGN PATENT DOCUMENTS

| | | |
|---|---|---|
| WO | 02/23215 A1 | 3/2002 |
| WO | 2006/059022 A1 | 6/2006 |
| WO | 2006088472 A1 | 8/2006 |

OTHER PUBLICATIONS

European Patent Office, Supplementary European Search Report, related Application No. EP 08745679, Mar. 30, 2011, 2 pages.

* cited by examiner

SYSTEM AND METHOD FOR ESTIMATING THE LOCATION OF A MOBILE DEVICE

BACKGROUND

Location based services for mobile stations are expected to play an important role in future applications of wireless systems. A wide variety of technologies for locating mobile stations have been developed. Many of these have been targeted towards the Federal Communication Commission's ("FCC") requirement to determine the location of emergency 9-1-1 callers with a high degree of accuracy. These technologies may be classified into external methods or network based methods. One example of an external method is the Global Positioning System ("GPS"). Network based methods may be further categorized depending on whether it is the network or the mobile station that performs necessary signal measurements. These signal measurements may involve the reception time of signals communicated between a base station ("BS") and a mobile station ("MS"), the angle of arriving signals or round trip delay measurements of signals communicated between a serving BS and an MS, or combinations thereof.

Most methods require specific hardware in the MS and/or in the network. Furthermore, Location Measurement Units ("LMU") are generally required for some methods to obtain knowledge about the relative time differences for sending signals to different mobile stations. As a result, a network operator is faced with a high initial cost for investing in new equipment. Such a disadvantage applies for both network and MS based methods.

For many location based services, it is expected that an accuracy of five hundred meters or even more is sufficient. For these types of services, investments in new expensive equipment is not easily justified. For some cases, a phased solution may be the most attractive choice where a network operator will initially offer services based on low accuracy positioning methods and may later invest in new equipment as revenues increase.

It is thus of interest to investigate what may be done with a minimum of network impact and expense. The currently available network information with respect to MS location includes the identity of the serving cell, timing advance and measurement reports from the MS. The timing advance is an estimate of a signal propagation time and is used for calculating the distance between the serving BS and the MS. MS measurement reports include measurements of the received signal strengths and identities of neighboring BSs as well as those of the serving BS.

Time of Arrival ("TOA") measurements provide a propagation time of signals between an MS and a BS. Time Difference of Arrival ("TDOA") measurements provide the difference of signal propagation time of signals between the MS and two different BSs. The measurements of the two BSs may then be used for calculating the actual position of the MS. This procedure, using well-known geometric equations, is commonly called triangulation.

FIG. 1 is an illustration of a TOA measuring procedure. With reference to FIG. 1, a mobile station 110 is capable of communication with at least three base stations 112, 114, 116. In order to determine the position of the MS 110, the distance between the MS 110 and each of the three BSs may be measured using a TOA technique. The measured distance 113 between the base station 112 and the MS 110 defines a circle 103 around the base station 112. The MS 110 is located somewhere on the circle 103. Likewise, the measured distances 115, 117 between the base stations 114, 116 and the MS 110 defines circles 105, 107, respectively, around the base stations 114, 116. The intersection of the circles 103, 105 and 107 defines the location of the MS 110.

In a TDOA measuring technique, the position determinations use TDOA calculations which are further based on TOA measurements. In this method, the position of the MS is located at or near the point where a plurality of hyperbolic arcs cross over one another. The two most common known positioning methods are the Down-Link Observed Time Difference of Arrival method ("DL-OTDOA") and the Up-link Time of Arrival method ("UL-TOA"). The DL-OTDOA method is generally based on measurements performed by the MS.

FIG. 2 is an illustration of a DL-OTDOA measuring procedure. With reference to FIG. 2, a MS 210 is capable of communication with a serving base station 216 at a distance 217 and further with two neighboring base stations 212, 214 at distances 213, 215 respectively. OTDOAs of downlink signals received from two base stations define a hyperbola, represented by dashed lines. The areas indicated outside the dashed lines represent measurement error margins. When three or more BSs are available, a plurality of hyperbolas may be defined and the MS will be located in the intersection 219 of these hyperbolas. To compensate for any non-time aligned transmissions from the different BSs, the Base Station Time Offsets ("BSTO") must be known if the BSs are unsynchronized to a global time reference. In conventional systems, BSTOs are generally obtained by employing LMUs in at least some of the BSs. UL-TOA operates in a similar manner, although in this case, the BSs make measurements on uplink signals transmitted by the MS.

The 3GPP standard recommended OTDOA solution involves installing LMUs at each BS in order to measure the BSTOs. This additional hardware requirement introduces a significant cost to network operators interested in utilizing OTDOA for MS location. Universal Mobile Telecommunications System ("UMTS") operators are currently not implementing OTDOA in either the handsets or the network since the 3GPP standard recommended solution is not cost effective and overly complex. The current focus by UMTS operators is to implement Assisted GPS ("A-GPS") as the only high-accuracy location method. In the event when A-GPS fails to produce a fix in difficult areas, e.g., indoors and dense urban areas, UMTS operators will not have a reliable fallback method. This is a disadvantage for UMTS carriers when compared to CDMA carriers employing Advanced Forward Link Trilateration ("AFLT") that is commonly relied upon as a reliable backup method in the event A-GPS fails. UMTS carriers will thus be required to address this issue once A-GPS begins to be deployed and location based services are offered that require a better yield than A-GPS provides.

Further issues may exist with plural BSs and MSs. For example, a network may comprise unsynchronized BSs in fixed geographical positions with plural MSs having unknown locations. This lack of synchronization manifests itself in unknown time offsets among the transmissions of the BSs. The BSs periodically (or with some known protocol) transmit signals S1 the form of which is known a priori at the MSs. The MSs observe these signals and form OTDOAs of these signals. The OTDOAs are hence families of hyperboloids in space or hyperbolae in two dimensions. Additionally, the BSs transmit other signals S2 which, upon receipt at an MS, trigger the generation of further signals S3 at the MS whose form and timing with respect to the signals S2 is known. The S3 signals then permit the BSs transmitting the signals S2 to determine the Round Trip Time ("RTT") with respect to the MS.

At any given time one may thus assume that there are some number of MSs in a network reporting the OTDOAs with respect to a subset of BSs in the network. Additionally, the BSs report the RTTs with respect to some subset of MSs in the network. It may then be assumed that all of this OTDOA and RTT data is associated with a time stamp indicating the time of receipt and collected at a device termed a Location Computer that computes MS locations and tracks the BSTOs.

In the absence of BSTOs, it is generally recognized that the location of a single MS may be achieved through the knowledge of multiple OTDOAs with respect to multiple BSs or fewer OTDOAs coupled with RTTs as recommended in 3GPP TS 25.305 version 7.3.0 Rel. 7. There are, however, several issues associated with a direct implementation of the recommendation in this technical standard. First, the BSs are unsynchronized which results in a modification of each OTDOA by an unknown amount equal to the relative time shift between the associated BSs. Thus, the BSTOs are not equal to zero, and may be quite large. Second, the number of practically observable BSs per MS is limited, i.e., there may be very few available OTDOAs. Third, the 3GPP standard recommended OTDOA solution involves installing LMUs in each BS to measure the associated BSTOs. This additional hardware requirement introduces a significant cost to operators interested in using OTDOA for MS location.

Thus, the implementation of the 3GPP standard recommended solution may not be viable unless some method of estimating BSTOs is made available. Once the BSTOs are estimated, however, it may be possible to determine the location of an MS by a single OTDOA and RTT. There is thus a need in the art for estimating BSTOs using OTDOAs and RTTs jointly in a single solution and for estimating BSTOs when available data is highly limited such that the available equations are under-determined, i.e., cases where there are more variables than equations. There is also a need in the art to determine the location of an MS when such under-determined equations exist or when using OTDOAs and RTTs jointly in a single solution.

Accordingly, there is a need for a method and system for estimating the location of a mobile station that receives signals from a plurality of base stations. Therefore, an embodiment of the present subject matter provides a method for estimating the location of a mobile station that receives signals from a plurality of base stations. The method comprises the steps of determining an OTDOA value at a mobile between a first signal received from a first base station and a second signal received from a second base station and determining an RTT value between the mobile and the first base station. The method further comprises selecting an initial location for the mobile that is within a first predetermined area and determining an estimated location for the mobile using the selected initial location, the OTDOA and RTT values, and an iterative search algorithm wherein the iterative search algorithm iterates a predetermined number of steps. If the estimated location is within a second predetermined area, and in such cases where the BSs are not time synchronized, this location may be used to estimate the BSTOs. In addition, if a running estimate of this BSTO has been maintained, the current estimate can be modified to exhibit the new information made available from the most recently derived BSTO estimate. The estimated location may also be stored if the estimated location is within this second predetermined area whereby the preceding steps may then be repeated within a predetermined time interval. A location for the mobile may then be determined from the stored estimated locations and the current best estimate of the BSTO, in a jointly optimal manner. It should be apparent to the reader that this includes the case where there may be no currently available best estimate of the BSTO, in which case the current estimate is also the current best estimate, and where the currently obtained location is computed directly from the current measurements.

In another embodiment of the present subject matter a method is provided for estimating the location of a mobile station that receives signals from a plurality of base stations. The method comprises the steps of determining an OTDOA value at the mobile between a first signal received from a first base station and a second signal received from a second base station, selecting an initial location for the mobile that is within a first predetermined area, and determining an estimated location for the mobile using the selected initial location, the OTDOA value, and an iterative search algorithm wherein the iterative search algorithm iterates a predetermined number of steps. The method further comprises storing the estimated location if the estimated location is within a second predetermined area, updating a running best estimate of the applicable BSTO and repeating the aforementioned steps within a predetermined time interval, and determining a calculated location for the mobile from the stored estimated locations and the current best estimate of the BSTO.

In yet another embodiment of the present subject matter a method is provided for estimating the location of a first mobile station and a second mobile station where each mobile station receives signals from the same plurality of base stations. The method comprises the steps of determining a first OTDOA value at the first mobile between a first signal received from a first base station and a second signal received from a second base station, determining a second OTDOA value at the second mobile between a third signal received from the first base station and a fourth signal received from the second base station, determining a first RTT value between the first mobile and the first base station, and determining a second RTT value between the second mobile and the second base station. The method further comprises the steps of selecting a first initial location for the first mobile that is within a first predetermined area, selecting a second initial location for the second mobile that is within a second predetermined area, and determining a first estimated location for the first mobile and a second estimated location for said second mobile. The estimated locations are determined using the selected initial locations, the first OTDOA value, the second OTDOA value, the first RTT value, the second RTT value, and an iterative search algorithm where the iterative search algorithm iterates a predetermined number of steps. The method further comprises the steps of storing the first estimated location if the first estimated location is within a third predetermined area and storing the second estimated location if the second estimated location is within a fourth predetermined area. In addition, if a running estimate of the BSTOs for each pair of BSs is maintained, these BSTOs are updated to manifest the new information available from the current location estimates for the MSs. The aforementioned steps may be repeated within a predetermined time interval, and a calculated location for the first mobile and a calculated location for the second mobile may be determined from the stored estimated locations and the current estimates of the BSTOs.

In an alternative embodiment of the present subject matter a method is provided for estimating the location of a first mobile station and a second mobile station where each mobile station receives signals from the same plurality of base stations. The method comprises the steps of determining a first OTDOA value at the first mobile between a first signal received from a first base station and a second signal received from a second base station, determining a second OTDOA value at the second mobile between a third signal received from the first base station and a fourth signal received from the second base station, selecting a first initial location for the first mobile that is within a first predetermined area, and selecting a second initial location for the second mobile that is within a second predetermined area. A first and second estimated location may be determined for the first and second mobiles, respectively, using the selected initial locations, the first OTDOA value, the second OTDOA value, and an iterative search algorithm wherein the iterative search algorithm iterates a predetermined number of steps. The method further comprises storing the first estimated location if the first estimated location is within a third predetermined area, storing the second estimated location if the second estimated location is within a fourth predetermined area, and repeating the aforementioned steps within a predetermined time interval. Further, if running estimates of the BSTOs are maintained, these estimates are updated in an optimum manner that includes the most recent information derived from the location estimates. Calculated locations for the first and second mobiles may then be determined from the stored estimated locations and the current best estimate of the BSTOs.

In yet another embodiment of the present subject matter a method is provided for estimating the locations of an integer number M of mobile stations where at least one of such MSs receives signals from at least two of N base stations (N>2). In this configuration, some MSs may receive signals from all BSs and some may receive signals from only a pair of BSs. Each MS receiving signals from any pair of BSs is then capable of generating an OTDOA with respect to such a pair. In addition, some number of MSs may have RTTs with respect to specific BSs. It should be clear to the reader that the above scenario will often be described mathematically by a set of under determined equations where an exact solution for at least some of the MS locations cannot be derived from the current set of OTDOA and RTT measurements. The method for this case then comprises the selection of initial locations in a first set of predetermined areas for each of the MMSs, applying an iterative search algorithm where the algorithm iterates for a predetermined number of steps, and storing the resulting MS locations that are obtained in a second set of predetermined areas. As should be evident, not every MS will generate such a valid location. For those locations that do fall into the second set of predeteremined areas, every BSTO that can be updated using such a location is updated to generate a current best estimate of that BSTO. Since there are multiple MSs available, it is possible that there will be more than one current MS location that may be used to update a particular BSTO estimate. The aforementioned steps may be repeated within a predetermined time interval, and a calculated location for each mobile station may be determined from the stored estimated locations and the current estimates of the BSTOs.

In all of the preceding embodiments, and any of a similar nature that may be envisioned, the selection of the first set of locations for the MSs within a set of predetermined regions may be implemented using other a priori knowledge pertaining to the MSs. This information could include the serving cell or sector, mobile power measurements, mobile traffic density distributions, mobile path profile from stored databases etc., all of which may constrain the initial location. Additionally the same set or a similar set of a priori information may be used to constrain the final algorithm determined location that determines when that location is considered valid and is used to update the current BSTO estimates.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
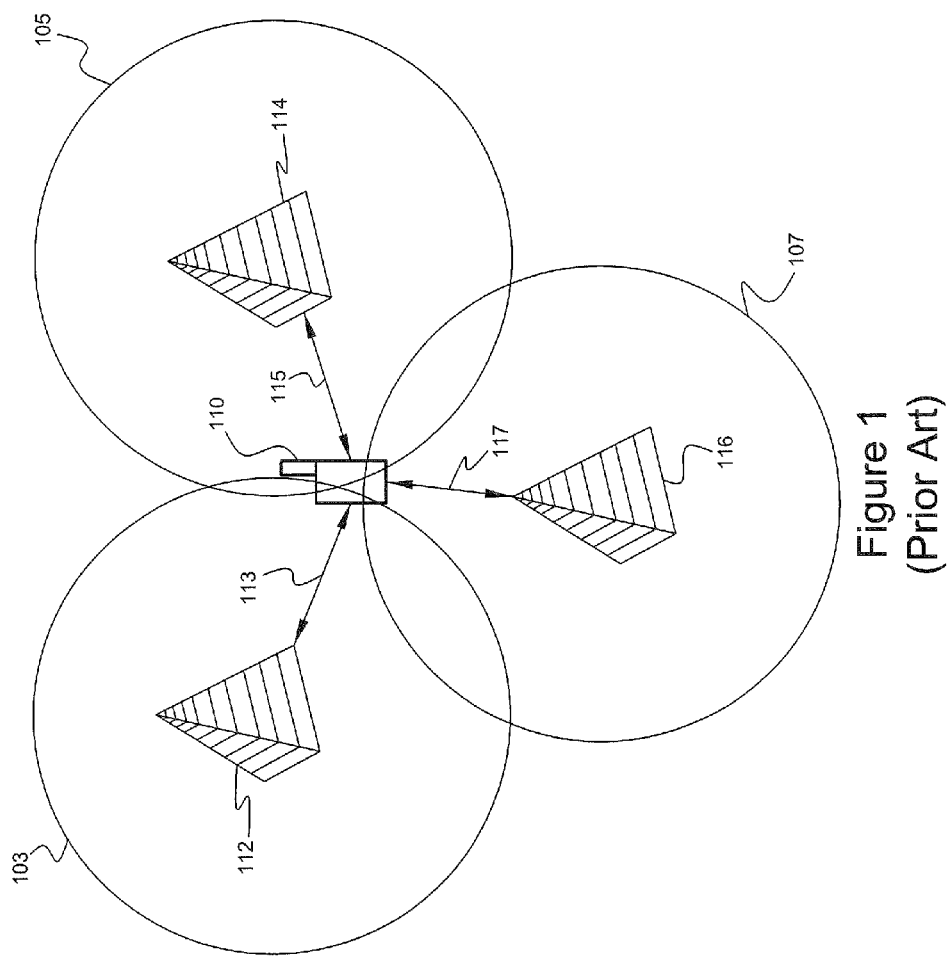
FIG. 1 is an illustration of a Time of Arrival measuring procedure.
Figure 2:
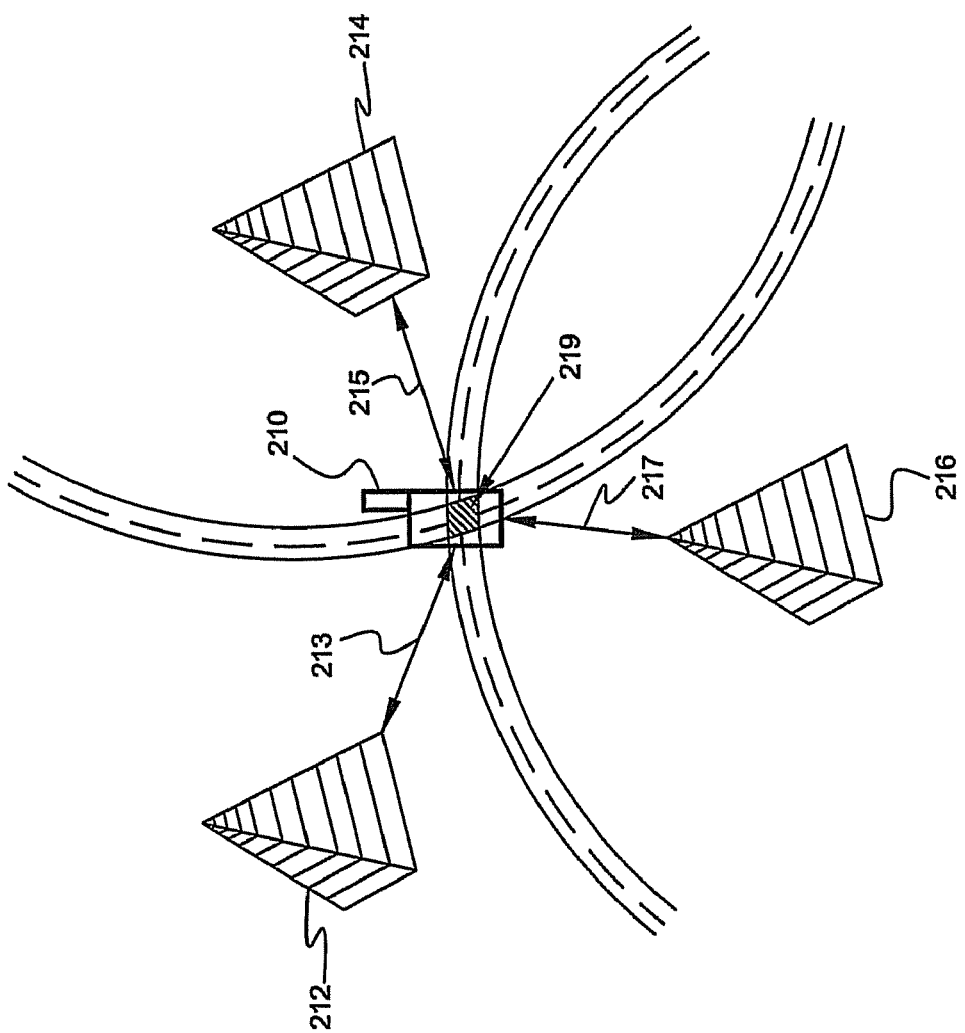
FIG. 2 is an illustration of a Down-Link Observed Time Difference of Arrival measuring procedure.

With reference to the figures where like elements have been given like numerical designations to facilitate an understanding of the present subject matter, the various embodiments of a system and method for estimating the location of a mobile device are described herein.

Through consideration of a general example, embodiments of the present subject matter may be properly described. Then, by selectively excluding certain mathematical relationships, it may be possible to consider all the data limited sub-categories discussed above. Each Observed Time Difference of Arrival (OTDOA) provides a single equation with three unknowns: a pair of two dimensional coordinates for the mobile station (MS) and the relative time shift between the transmissions of the two base stations (BS) involved in the OTDOA. Each Round Trip Time (RTT) provides a single equation with two unknowns: the two dimensional coordinates of the MS.

Thus, every OTDOA may be represented in the following manner:

$$A_{12} = \Delta_{12} + R_{1A} - R_{2A} + N_{A12}, \quad (1)$$

where the base station time offset ("BSTO") represented by $\Delta_{12}$ is the actual relative time offset of the first BS with respect to the second BS, $R_{1A}$ is the distance from the first MS or MS "A" to the first BS, $R_{2A}$ is the distance from MS "A" to the second BS, $A_{12}$ is the OTDOA observed by MS "A", and $N_{A12}$ is the noise in the observation.

An RTT for the same MS "A" may be written, assuming the serving site is the first BS, as:

$$T_{RA} = 2R_{1A} + N_{1A}, \quad (2)$$

where $T_{RA}$ is the RTT measured by the serving BS, e.g., the first base station on MS "A" and $N_{1A}$ is the noise on the measurement.

While each of the subscripted $R_{(.)}$ terms may be rewritten in terms of two dimensional coordinates, e.g., an x-coordinate and a y-coordinate, it is conceptually easier to retain the R. terms for ease of exposition. Writing similar equations for a different MS, MS "B", but the same BS pair, the following relationship may be provided:

$$B_{12} = \Delta_{12} + R_{1B} - R_{2B} + N_{B12}, \quad (3)$$

where the BSTO represented by $\Delta_{12}$ is the actual relative time offset of the first BS with respect to the second BS, $R_{1B}$ is the distance from the second MS or MS "B" to the first BS, $R_{2B}$ is the distance from MS "B" to the second BS, $B_{12}$ is the OTDOA observed by MS "B", and $N_{B12}$ is the noise in the observation.

An RTT for the same MS "B" may be written, assuming the serving site is the second BS, as:

$$T_{RB} = 2R_{1B} + N_{1B}, \quad (4)$$

where $T_{RB}$ is the RTT measured by the serving BS, e.g., the second base station on MS "B" and $N_{1B}$ is the noise on the measurement.

Through subtraction of equation (3) from equation (1), one may remove the unknown relative BSTO $\Delta_{12}$. The resulting equation obtained from the OTDOAs may be represented as:

$$A_{12} - B_{12} = R_{1A} - R_{2A} - (R_{1B} - R_{2B}) + N_{A12} - N_{B12}. \quad (5)$$

Equation 5 represents a single equation with four unknowns, namely, the two dimensional coordinates of the MSs. One may then visualize that for each additional BS for which the current MS pair has derived OTDOAs, one obtains a further equation in the same four unknowns. For example, if there was a third BS, one may provide the following relationship:

$$A_{13} - B_{13} = R_{1A} - R_{3A} - (R_{1B} - R_{3B}) + N_{A13} - N_{B13}. \quad (6)$$

It thus follows that for this MS pair, a set of five BSs will provide the bare minimum number of equations needed for a solution to the location of each MS. It should be noted that no RTTs have been introduced into this solution. If RTTs were also available for each MS, then a set of three fully observed (all OTDOAs available) BSs would provide an alternate solution.

Considering an example where one possesses three MSs and if RTTs are excluded, two sets of three equations may be constructed similar to the equations above provided four fully observed BSs are present. Thus, six equations and six unknowns (the two dimensional coordinates of the three MSs) result. Enumerating these equations provides the following relationships:

$$A_{12} - B_{12} = R_{1A} - R_{2A} - (R_{1B} - R_{2B}) + N_{A12} - N_{B12}, \quad (7)$$

$$A_{13} - B_{13} = R_{1A} - R_{3A} - (R_{1B} - R_{3B}) + N_{A13} - N_{B13}, \quad (8)$$

$$A_{14} - B_{14} = R_{1A} - R_{4A} - (R_{1B} - R_{4B}) + N_{A14} - N_{B14}, \quad (9)$$

$$A_{12} - C_{12} = R_{1A} - R_{2A} - (R_{1C} - R_{2C}) + N_{A12} - N_{C12}, \quad (10)$$

$$A_{13} - C_{13} = R_{1A} - R_{3A} - (R_{1C} - R_{3C}) + N_{A13} - N_{C13}, \quad (11)$$

$$A_{14} - C_{14} = R_{1A} - R_{4A} - (R_{1C} - R_{4C}) + N_{A14} - N_{C14}, \quad (12)$$

Once the locations of a single MS is determined, the relative BSTOs for all observed BSs may readily be generated in the absence of noise. For example, with the location of MS "A" determined one may directly solve equation (1) to obtain the relative BSTO between the first and second BSs:

$$\Delta_{12} = A_{12} - R_{1A} + R_{2A} - N_{A12}, \quad (13)$$

where the noise term is ignored and set to zero.

By way of further example, given fully determined equations (of whatever combination), one may employ embodiments of the present subject matter to determine MS locations. Assuming M MSs and N BSs, where each MS has an OTDOA with respect to every pair of BSs and in addition every MS has an RTT with respect to a single BS (the serving site), one may provide the following relationships using only the OTDOAs and ignoring noise:

$$f_{(A,B,1,2)} = R_{1A} - R_{2A} - (R_{1B} - R_{2B}) - (A_{12} - B_{12}), \quad (14)$$

$$f_{(A,B,1,3)} = R_{1A} - R_{3A} - (R_{1B} - R_{3B}) - (A_{13} - B_{13}), \quad (15)$$

$$\ldots \quad (16)$$

$$f_{(A,B,1,N)} = R_{1A} - R_{NA} - (R_{1B} - R_{NB}) - (A_{1N} - B_{1N}), \quad (17)$$

$$f_{(A,C,1,2)} = R_{1A} - R_{2A} - (R_{1C} - R_{2C}) - (A_{12} - C_{12}), \quad (18)$$

$$\ldots \quad (19)$$

$$f_{(A,C,1,N)} = R_{1A} - R_{NA} - (R_{1C} - R_{NC}) - (A_{1N} - C_{1N}), \quad (20)$$

$$\ldots \quad (21)$$

$$f_{(A,M,1,2)} = R_{1A} - R_{2A} - (R_{1M} - R_{2M}) - (A_{12} - M_{12}), \quad (22)$$

$$\ldots \quad (23)$$

$$f_{(A,M,1,N)} = R_{1A} - R_{NA} - (R_{1M} - R_{NM}) - (A_{1N} - M_{1N}), \quad (24)$$

where the $f_{(\ldots)}$ terms represent the differences of the respective hyperbolic terms from which the OTDOA differences have been subtracted out and Equations (16), (19), (21) and (23) represent additional relationships using only the OTDOAs and ignoring noise that have been omitted for ease of explanation.

In a similar manner one may provide the relationships for the RTTs:

$$f_{rA} = 0.5 * T_{RA} - R_{p_AA}, \quad (25)$$

$$f_{rB} = 0.5 * T_{RB} - R_{p_BB}, \quad (26)$$

$$\ldots \quad (27)$$

$$f_{rM} = 0.5 * T_{RM} - R_{p_MA}, \quad (28)$$

where the quantities $p_{(\cdot)}$ represent any of the numbers 1 through N since the assumption is that the serving site for each MS could be any one of the BSs. Equation (27) represents additional relationships for the RTTs that have been omitted for ease of explanation. Forming vectors R, f, and $\alpha$ provides the following:

$$R = [R_{1A} R_{1B} R_{1C} \ldots R_{1M} R_{2A} R_{2B} \ldots R_{2M} \ldots R_{NA} \ldots R_{NM}]^t, \quad (29)$$

$$f = [f_{(A,B,1,2)} f_{(A,B,1,3)} \ldots f_{(A,M,1,N)} f_{rA} \ldots f_{rM}]^t, \quad (30)$$

$$\alpha = [A_{12} - B_{12} A_{13} - B_{13} \ldots A_{1N} - M_{1N} 0.5 * T_{rA} 0.5 * T_{rB} \ldots 0.5 * T_{rM}]^t. \quad (31)$$

Then one may provide:

$$f = H(R + N_G) - \alpha, \quad (32)$$

where H is a matrix having elements in [0, −1, 1] and of a size L×MN where L represents the number of equations. $N_G$ is a noise vector with terms representing the noise components on every radial measurement. It should be noted that both the RTT and the OTDA are made by two radial distance measurements in each case and hence aggregating the noise to the R vector directly in a linear sum is appropriate. At this point there are two approaches one may take to derive a solution. One approach assumes Gaussian noise on each measured quantity.

Assuming Gaussian noise with covariance matrix $C_N$, since the vector f is identically zero, $HR + HN_G - \alpha = 0$, so that the random vector $X = -HN_G$ is Gaussian with statistics of zero mean and covariance $C_{HN} = E[HN_G N^t_G H^t] = HC_N H^t$. The probability that X takes the value $HR - \alpha$ is governed by the quadratic form:

$$Q(Z) = (HR - \alpha)^t C_{HN}^{-1}(HR - \alpha), \quad (33)$$

which follows since the probability is of the form of a constant times $$\frac{1}{\sqrt{|C_{HN}|}} \exp(-XC_{HN}^{-1}X),$$

which is maximized by the minimum quadratic form. Z is the multi-dimensional location of all the MSs, i.e., Z is the vector whose components are the two dimensional components of all the MS locations. Intuitively, this minimization implies is that one desires HR as close to α as possible and weighted in such a manner as given by the quadratic form in equation (33). Next, one should to minimize Q(Z) as a function of Z. The maximizing value $\hat{Z}$ is then the solution for the MS locations that maximizes the probability that the observed OTDOAs and RTTs fit the Gaussian noise model.

Proceeding from this point by initially selecting a start location $Z_o$ for the locations of the MSs and then applying a gradient based location updating routine that iteratively seeks to maximize Q(Z), one may provide the following relationship:

$$\nabla_Z Q(Z) = \nabla_Z ((HR-\alpha)^t C_{HN}^{-1} (HR-\alpha)) = G_c^t H^t C_{HN}^{-1} (HR-\alpha) + (R^t H^t - \alpha^t) C_{HN}^{-1} HG_c \quad (34)$$

where $G = \nabla_Z R$ is a matrix of the gradient function on each of the components of the location vector R (the gradient is strictly defined only on a scalar) which may be readily derived. The terms in the gradient should be evaluated taking each column of G separately in equation ( ) as indicated by $G_c$. The location may then be updated according to:

$$Z_{k+1} = Z_k - \delta(\nabla_{Z_k} Q(Z_k)), \quad (35)$$

where δ must be selected small enough such that $(\nabla_{Z_k} Q(Z_k))$ changes slowly over can only change slowly over $[Z_k, Z_{k+1}]$. Since there is no obvious method to determine this without solving complicated equations that are not essential to a solution, experimentation with a range of values of δ may be needed in practice.

Thus, a deterministic solution may be formed. For example, let f represent the column vector formed by vectorizing all the $f_{(.)}$ components above. It is clear then that every one of the components should ideally vanish at the solution. However, in the practical case may not be achieved due to noise. Hence, considering the quadratic function Ψ(f) given by:

$$\Psi(f) = f_{(A,B,1,2)}^2 + f_{(A,B,1,3)}^2 + \ldots + f_{(r,M)}^2, \quad (36)$$

one may note that Ψ(f) is a non-negative function. Minimizing Ψ(f) as a function of the location vector Z, one may proceed by initially selecting a start location $Z_o$ for the locations of the MSs and then applying a gradient based location updating routine that iteratively seeks to minimize Ψ(f). This results in the following relationship:

$$\nabla_Z \Psi(\eta) = \nabla_Z (f_{(A,B,1,2)}^2 + f_{(A,B,1,3)}^2 + \ldots + f_{(r,M)}^2). \quad (37)$$

Equation (37) is no different than assuming that the inner noise covariance matrix in the Gaussian noise example above is an identity. This is an unweighted least squares solution. Thus, it follows that $$\nabla_Z \Psi(f) = G_c^t H^t (HR-\alpha) + (R^1 H^t - \alpha^t) HG_c \quad (38)$$

where G has been previously defined and the evaluation should be made over the variables in Z by evaluating equation (38) column-wise. The location updates then follow as:

$$Z_{k+1} = Z_k - \delta(\nabla_{Z_k} Q(Z_k)), \quad (39)$$

where δ is a small scalar constant controlling the magnitude or step size of the increment in the location vector.

In an embodiment where plural OTDOAs are extracted by plural MSs are available in a particular environment, it may be possible to estimate the BSTOs. For example, five BSs and two MSs with OTDOAs available for all combinations, or four BSs and three MSs with all combinations of OTDOAs offer such a complete solution. Various combinations of the OTDOAs and RTTs may also provide complete solutions for the MS locations. For example, three BSs and two MSs with all OTDOA combinations and RTTs for each MS provides a full solution. The solution method for these aforementioned examples have been described above.

Given that a particular set of MS locations has been obtained, the BSTOs may then be computed. This may be accomplished by computing the exact OTDOA that should be observed given the derived location and subtracting this out from the observed OTDOA. For example, if the location of MS "A" has been obtained, then $R_{1A}$ and $R_{2A}$ may be computed so that the relative BSTO between the first and second BSs may be obtained by:

$$\Delta_{12} = A_{12} - R_{1A} + R_{2A}. \quad (40)$$

Since a number of MS locations may have been obtained, one would want to combine all the estimates of $\Delta_{12}$ that may be available for all MSs having OTDOAs with respect to the same BS pair. An increased performance may be obtained if one combines multiple data sets. In each case estimated MS locations are used to compute the BSTOs. One may view this as a problem in which the BSTOs are a set of unknown parameters that vary slowly and that each data set offers a new opportunity for estimating these BSTOs. Using such an approach produces accurate estimates of the BSTOs as seen in simulations where the MSs are randomly mobile in the applicable BTS cells. In simulations assuming Gaussian noise with a standard deviation of 70 m, the BSTOs are generally estimated well under 50 m utilizing approximately 200 data sets. Additionally, the availability of RTTs may greatly improve the accuracy of the locations and hence facilitates BSTO estimation with significantly fewer data sets than are needed in the case where only OTDOAs are available.

A challenging problem exists when a network must determine the location of an MS with a single inter-site OTDOA. For example, the MS under consideration possess a visibility in terms of received signals to only two BSs. One of these BSs may be the serving BS and the other BS a visible neighboring BS. Additionally, each BS may have an associated RTT computed and available via the serving BS. There may, however, be multiple MSs in the general vicinity or serving areas of the BSs that also share the same visibility scenario. The determination of the BSTOs when the available data is highly limited such that under-determined equations exist (e.g., cases where there are more variables than equations) would appear to be without a solution. For example, in a case having two observable BSs and two MSs, each MS having an OTDOA with respect to the pair of BSs and each MS having an associated RTT with respect to the serving BS, one may provide, considering the observations from MS "A":

$$A_{12} = \Delta_{12} + R_{1A} - R_{2A} + N_{A12} \quad (41)$$

where the BSTO represented by $\Delta_{12}$ is the actual relative time offset of the first BS with respect to the second BS, $R_{1A}$ is the distance from the first MS or MS "A" to the first BS, $R_{2A}$ is the distance from MS "A" to the second BS, $A_{12}$ is the OTDOA observed by MS "A", and $N_{A12}$ is the noise in the observation. Letting ($x_A$, $y_A$) be the Cartesian coordinates of MS "A", $(x_1, y_1)$ be the coordinates of the first BS and $(x_2, y_2)$ be the coordinates of the second BS, the following relationship may be formed:

$$A_{12} = \Delta_{12} + \sqrt{(x_A - x_1)^2 + (y_A - y_1)^2} - \sqrt{(x_A - x_2)^2 + (y_A - y_2)^2} + N_{A12}, \quad (42)$$

and considering the observations from MS "B", $$B_{12} = \Delta_{12} + R_{1B} - R_{2B} + N_{B12} \quad (43)$$

where the BSTO represented by $\Delta_{12}$ is the actual relative time offset of the first BS with respect to the second BS, $R_{1B}$ is the distance from the second MS or MS "B" to the first BS, $R_{2B}$ is the distance from MS "B" to the second BS, $B_{12}$ is the OTDOA observed by MS "B", and $N_{B12}$ is the noise in the observation. Equation (43) may now be rewritten as:

$$B_{12} = \Delta_{12} + \sqrt{(x_B - x_1)^2 + (y_B - y_1)^2} - \sqrt{(x_B - x_2)^2 + (y_B - y_2)^2} + N_{A12} \quad (44)$$

where $(x_B, y_B)$ are the coordinates of MS "B". Considering the RTTs obtained from the network or from the MS, $$T_{RA} = 2R_{1A} + N_{1A} \quad (45)$$

where $T_{RA}$ is the RTT measured by the serving BS, e.g., the first base station on MS "A" and $N_{1A}$ is the noise on the measurement. Equation (45) may be rewritten as $$T_{RA} = 2\sqrt{(x_A - x_1)^2 + (y_A - y_1)^2} + N_{1A} \quad (46)$$

Similarly, for the RTT for MS "B", one has $$T_{RB} = 2R_{1B} + N_{1B}, \quad (47)$$

where $T_{RB}$ is the RTT measured by the serving BS, e.g., the second base station on MS "B" and $N_{1B}$ is the noise on the measurement. Equation (47) may be rewritten as:

$$T_{RB} = 2\sqrt{(x_B - x_2)^2 + (y_B - y_2)^2} + N_{2B} \quad (48)$$

One may observe that even in the absence of all the noise terms $N_{xy}$, we have the positions of the MSs and the relative BSTOs between the two BSs as unknowns. In two dimensions the total unknowns are thus five. However, there are only four non-linear equations available. This observation may be generalized to cases with multiple MSs and multiple BSs where some combination of OTDOAs and RTTs may be available but where, even in the absence of noise, no solution can be obtained since the equations are underdetermined. The methods described here are however applicable in a manner such that the MS locations can be estimated.

Through the utilization of an iterative search algorithm such as, but not limited to, a gradient search algorithm that fits a locus onto the set of undetermined equations, and with the initial locations of the MSs specified using one of a range of randomization techniques, any currently available BSTO estimates can be improved on while additionally solving for the locations of the MSs.

This two dimensional space wherein the initial location of each MS is placed may be constrained as the serving cell for each applicable MS as determined by the serving BS or may be another cell. However, many other randomly selected locations can also be used. For example, one may have historical data for the location of a particular mobile available in a database. Such historical data and associated time-stamps may be used to define a region in the two dimensional space that is most likely for the mobile at the current time. This then provides an additional probabilistic constraint on the initial and final locations of the mobile. Another example applicable to the selection of such regions may be the availability of various mobile parameters such as power measurements which may define an applicable region for the start and end locations in two dimensions.

In addition, if any of the MSs whose positions are currently desired has been located with high confidence in the recent past, such information may be used to define the start and final valid regions (with an assigned probability distribution) to be used for the mobile. Indirectly then, this produces a further set of equations that adds to the original underdetermined equations, albeit in a probabilistic manner.

With reference to the example of two MSs with 2 BSs, OTDOAs and RTTs, the iterative search algorithm may apply a finite and/or fixed number of iterative steps. At the end of this iterative process two MS locations may be produced. While these two MS locations may be inaccurate, the locations exist on loci that solve the under-determined set of equations. If the locations are outside the applicable regions, however, they may not be utilized in further processing. If the locations are inside the applicable cells, they may be utilized to generate an estimate of the relative BSTOs. Viewed mathematically, the primary function of the gradient search algorithm (or other algorithm) is to mitigate the effect of noise in the measurements of the OTDOAs and RTTs. Further if the originally set locations are obtained with a certain probability distribution, the resulting BSTO estimates also possess a certain probability distribution. The latter distributions may then be used in updating the current best estimate of any of the BSTOs. The current best estimate of the BSTO may then be fed into the determination of the current estimated location of any of the mobiles.

On examining the equations for the 2 BS, 2 MS case above, it may be observed that there are four available equations and five variables. If one had yet more MSs, one would have one more variable than the number of available non-linear equations, so that the set of equations remains under-determined, as for example with k MSs having simultaneous observations of the 2 BSs, would result in 2 k non-linear equations but 2 k+1 unknowns. The randomized or probabilistically selected regions for initial location and the final location of each MS derived from the search algorithm provide the needed tools to generate an update to both the current best BSTO estimate and thereby also the MS location estimates. The search algorithm thus finds loci in the two dimensional space where the under-determined equations are satisfied while also satisfying the region constraints; a sequence of such solutions is capable of continuous refinement in the BSTO estimates, and this may then be applied to better MS location estimates.

The sets of OTDOA and/or RTT data provided as inputs to the above calculations may also be limited in time to a window where the BSTOs do not drift appreciably. For example, a sliding window of data sets, indexed over time, may provide one method of using valid data for this purpose, however, it is envisioned that other similar methods may be employed with embodiments of the present subject matter and such an example is not intended to limit the scope of the claims appended herewith. The BSTO estimates may be provided to an averaging filter such as, but not limited to, a randomization smoothing filter that averages a large set of estimates resulting in an accurate estimate of the exact BSTOs. This estimation may be made accurate by ensuring that the RTTs form a set representative of randomized points within the appropriate cells. For example, the estimate may be considered valid if for each MS, the RTT values over the observed sets possess a uniform probability density over approximately the full cell radius. Thus, the filter maintains a set of estimates for MSs such that the RTTs are uniformly distributed (or with some other fixed distribution) over the applicable region. This may be achieved since the RTT values for each MS in each data set are known, as are the Cell-ID and the cell geometry.

Thus, the randomized selection process and the limited iterative equations may generate BSTO estimates that are accurate even though in each set of data no solution for either the BSTOs or the actual MS locations is possible. This occurs as a mathematical property of the random distribution used to define the start locations in the iterative equations and the deterministic selection of data that satisfies the randomized RTT criterion. Even though these equations cannot be solved explicitly for each variable, an iterative set of equations may be generated that places the MSs on loci satisfying the existing equations. These iterative equations start with a randomly selected initial location picked with some fixed distribution, and then a solution may be iteratively determined upon the valid loci. By fixing the number of iterations, an actual solution may be obtained. For example, while the estimated locations of the MSs are inaccurate, i.e., the locations exist on valid loci but not on an exact point, the estimated locations may be utilized to produce estimates of the relative BSTOs. Thus, if data is obtained for a different pair of MSs at the same or approximately equal time, these MSs may be provided on loci that satisfy the equations and produce estimates of the relative BSTOs.

As more MSs are drawn into the iterative equations and subjected to sufficient randomization of their actual (but unknown) locations, further estimates of the relative BSTOs may be ascertained. This data may be from the same pair of MSs or some other MSs served by the same BSs. Of course, the data may be provided within a time window ensuring non-significant BSTO drift. Statistically, the BSTO estimates may be distributed with a mean that converges to the correct value; thus, the extraction of this statistical mean may provide a final BSTO estimate. This method may be applied in any case where the BSTOs need to be estimated and where the available data represents an under-determined set of equations, e.g., in a case having three BSs and two MSs where only OTDOA information is available.

The aforementioned technique may be applied to a plurality of under-determined equations. For example, in a case having two BSs and one-hundred MSs where all MSs have an RTT with respect to one or the other BS and an OTDOA with respect to the BS pair, one may apply the data as fifty sets of two BS/two MS data or a single set of two BS/one-hundred MS data. In either instance, there exist under-determined equations. The former example provides the capability to apply randomized averaging whereas the latter example produces a single solution without randomization. Additionally, randomization may be added in either example by running the same data through the search algorithm with different randomized start locations for the MS positions. In each case randomization may be taken to mean any form of circumscribing the regions of valid initial and final locations for each MS, using means such as the expected probability of location in a region, serving cell or sector, past history data for the location of a particular mobile etc.

The following example taken in one dimension illustrates the mathematical underpinnings of the under-determined method. Assuming that the MSs are constrained to lie on a straight line between the BSs, a single MS makes an OTDOA measurement with respect to the two BSs. Let the locations of the BSs be at $x_1$ and $x_2$ and the actual location of the MS at $x_A$, the following relationship may be written:

$$A_{12} = \Delta_{12} + (x_A - x_1) - (x_2 - x_A) + N_{12}, \quad (49)$$

where $A_{12}$ is the OTDOA and $N_{12}$ is the noise on the observation. This is a single equation in the two variables $\Delta_{12}$ (the actual relative BSTO) and $x_A$. Given the OTDOA $A_{12}$, any point on the line between the BSs satisfies the equation (unlike in higher dimensions where only specific loci are applicable). Thus, one may place the location of the MS anywhere on the connecting line. Placing the location randomly at $x'_A$ with a uniform distribution, the corresponding estimate of the BTSO may be provided as:

$$\hat{\Delta}_{12} = A_{12} - (x'_A - x_1) + (x_2 - x'_A) = \Delta_{12} + (x_A - x_1) - (x_2 - x_A) - (x'_A - x_1) + (x_2 - x'_A) + N_{12}. \quad (50)$$

If multiple observations are made and in each case the estimated location is taken randomly from the uniform distribution and if on these observations the actual MS locations are also uniformly random on the connecting line segment, one may provide the following relationship:

$$E[\hat{\Delta}_{12}] = \Delta_{12} + 2E[x_A] - 2E[x'_A] + E[N_{12}]. \quad (51)$$

If the random distributions of location selections and actual location are the same, and if the noise is zero provides that all terms other than the first on the right hand side of the equation sum to zero. Thus, the average of the estimates is exactly the correct BSTO $\Delta_{12}$. In higher dimensions such as in the 2 BS, 2 MS, two dimensional case, only particular loci will satisfy the equations. Thus the parallel is that the search algorithm randomly picks points on valid loci that have to be computed for each data set. Similarly, the actual locations of the MSs are random within the cells. Thus, the same basic principles may be observed in the higher dimensional cases similar to that mathematically shown in the one dimensional case.

Figure 3:
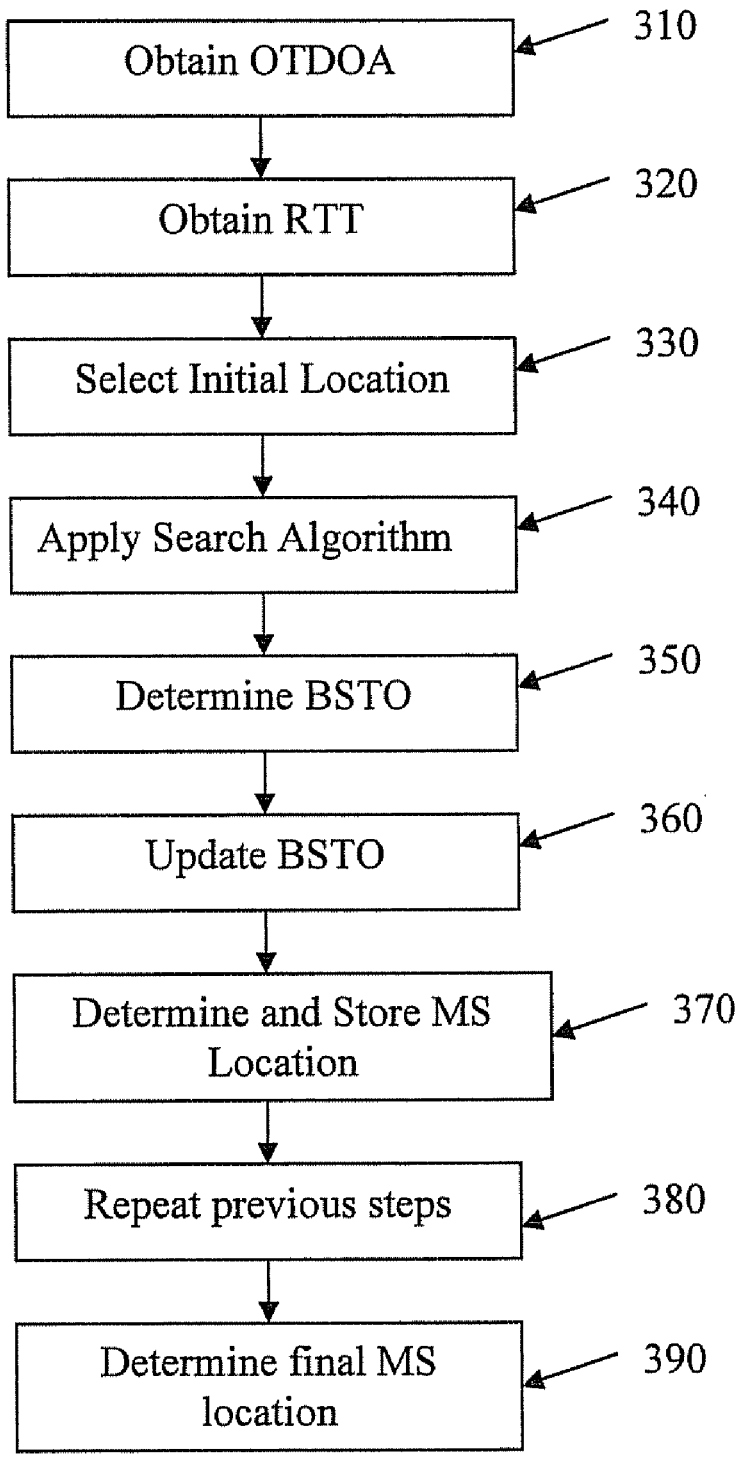
FIG. 3 is an algorithm according to one embodiment of the present subject matter.

FIG. 3 is an algorithm according to one embodiment of the present subject matter. With reference to FIG. 3, in step 310, a mobile station ("MS") determines an observed time difference of arrival ("OTDOA") value between a first signal received from a first base station ("BS") and a second signal received from a second BS. An exemplary MS may include a cellular telephone, text messaging device, computer, portable computer, vehicle locating device, vehicle security device, communication device, or wireless transceiver. While the present algorithm may be implemented in a system having unsynchronized BSs, the algorithm may also be implemented in a system having synchronized BSs. In step 320, a round trip time ("RTT") value may be determined between the MS and the first BS. An initial location may be selected for the MS that is within a first predetermined area as represented by step 330. In steps 340-350 an estimate of the BSTO may be obtained using the selected initial location, the OTDOA and RTT values, and an iterative search algorithm. If a best estimate for the BSTO exists, this new estimate may be used to update the best estimate in step 360. If not, the new estimate defines the current best estimate. This BSTO estimate is then used to solve for the MS location and, in step 370, an estimated location for the MS is generated. While the first predetermined area may be coextensive with an area served by the first BS, such an example should not limit the scope of the claims appended herewith. For example, the first predetermined area may be or include an area or region service by a neighboring BS. Alternatively the first predetermined area may be a region within which the MS has some prior known probability distribution or even a point on some locus where the MS has been observed (as gleaned from an available mobile location database). The iterative search algorithm in step 340 may conduct any number or a predetermined number of steps. An exemplary algorithm may be, but is not limited to, a gradient search algorithm. In step 370, the estimated location may be stored if the estimated location is within a second predetermined area. The first predetermined area may be the same as the second predetermined area, and may be coextensive with an area served by the first BS. The second pre-determined area may also be any other region, defined probabilistically or otherwise, though in most practical cases it will coincide with the first pre-determined area. As represented by step 380, the aforementioned steps, e.g., steps 310 through 370 may be repeated within a predetermined time interval or may be repeated as a function of another metric such as, but not limited to, a fixed number of repetitions, etc. In a further embodiment of the present subject matter, the predetermined time interval may be a function of a base station time offset ("BSTO") drift value for a BSTO between the first and second BSs. A final location of the MS may be determined in step 390 using some best estimate from the set of stored MS locations.

In an alternative embodiment, for each repetition of selecting an initial location of the MS (step 330), the initial location may be selected at random within the first predetermined area. A calculated location may then be determined for the MS from the stored estimated locations in step 390. Of course, any number of stored estimated locations may be utilized to produce the calculated location. Further, the calculated location may be determined as an average of the stored estimated locations and may be determined using a measure of central tendency. Further embodiments of the present subject matter may determine the calculated location using a known mathematical process such as, but not limited to, average, weighted average, median, mode, midrange, and mean.

Figure 4:
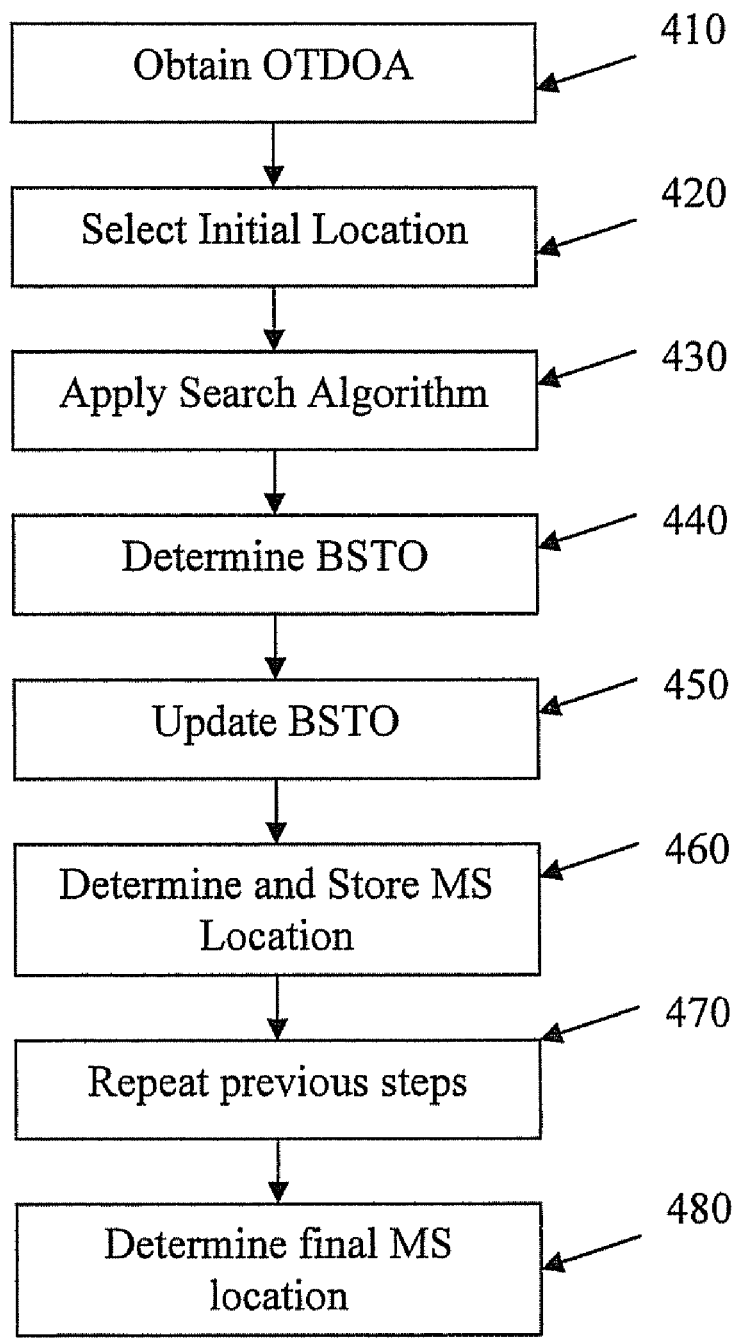
FIG. 4 is an algorithm according to another embodiment of the present subject matter.

FIG. 4 is an algorithm according to another embodiment of the present subject matter. With reference to FIG. 4, in step 410, an OTDOA value is determined at a MS between a first signal received from a first BS and a second signal received from a second BS. An exemplary MS may include a cellular telephone, text messaging device, computer, portable computer, vehicle locating device, vehicle security device, communication device, or wireless transceiver. The first and second BSs may be unsynchronized or may be synchronized. In addition, the first and second BSs may be in close proximity to the MS or may be located a considerable distance therefrom. An initial location for the MS may be selected that is within a first predetermined area in step 420. A search algorithm may then be applied to fit an applicable locus as shown in step 430, using the selected initial location and the OTDOA value. In step 440 the result of this search algorithm generates a BSTO estimate. If the location determining entity has a running best estimate of this particular BSTO, the most recent estimate is used to update the best estimate in an optimal manner (step 450). If there is no running best estimate, the current determined estimate may be used as the best estimate. This best estimate of the BSTO may now be used to determine a location for the MS. This location is stored if it falls in a second predetermined area (step 460) While the first predetermined area may be coextensive with an area served by the first BS, such an example should not limit the scope of the claims appended herewith. For example, the first predetermined area may be or include an area or region served by a neighboring BS. The iterative search algorithm may conduct any number or a predetermined number of steps. An exemplary algorithm may be, but is not limited to, a gradient search algorithm. In step 460, the estimated location may be stored if the estimated location is within a second predetermined area. The first predetermined area may be the same as the second predetermined area, and may be coextensive with an area served by the first BS. As represented by step 470, the aforementioned steps, e.g., steps 410 through 460 may be repeated within a predetermined time interval or may be repeated as a function of another metric such as a predetermined number of repetitions, etc. In a further embodiment of the present subject matter, the predetermined time interval may be a function of a BSTO drift value for a BSTO between the first and second BSs.

In an alternative embodiment, for each repetition of selecting an initial location of the MS (step 420), the initial location may be selected at random within the first predetermined area. In step 480, a calculated location for the MS may be determined from the stored estimated locations. Of course, any number of stored estimated locations may be utilized to produce the calculated location. Further, the calculated location may be determined as an average of the stored estimated locations and may be determined using a measure of central tendency. Further embodiments of the present subject matter may determine the calculated location using a known mathematical process such as, but not limited to, average, weighted average, median, mode, midrange, and mean.

Figure 5:
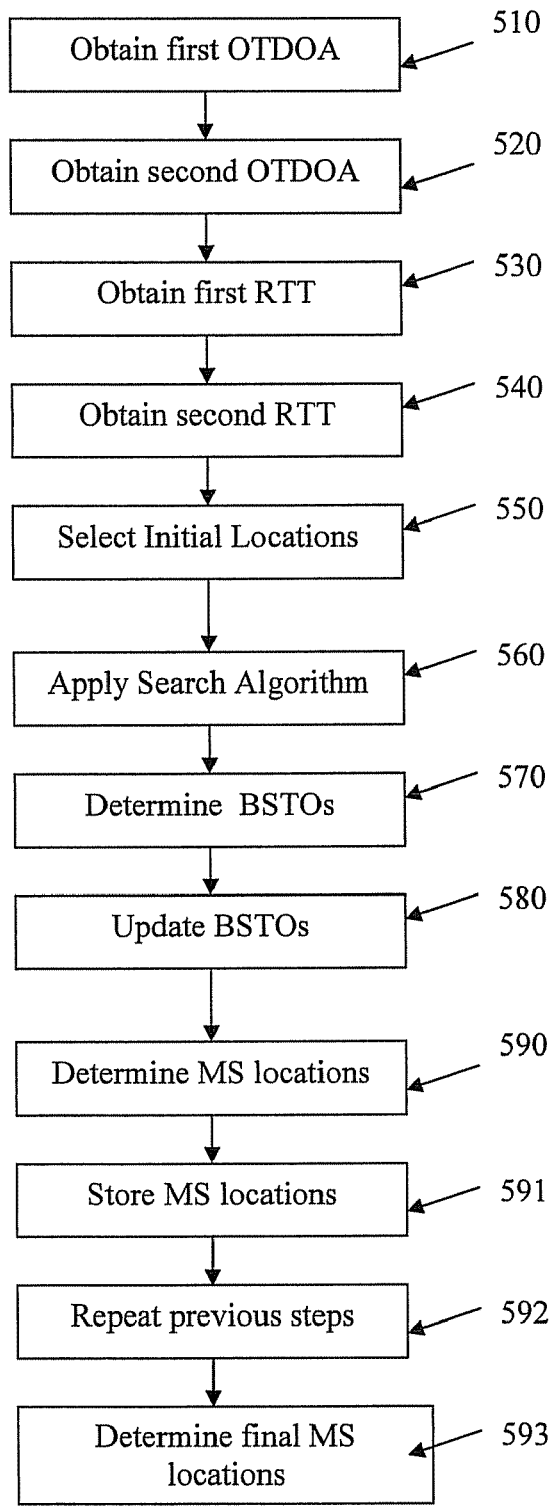
FIG. 5 is an algorithm according to a further embodiment of the present subject matter.

FIG. 5 is an algorithm according to a further embodiment of the present subject matter. With reference to FIG. 5, in step 510, a first observed time difference of arrival ("OTDOA1") value is determined at a first MS between a first signal received from a first BS and a second signal received from a second BS. An exemplary MS may include a cellular telephone, text messaging device, computer, portable computer, vehicle locating device, vehicle security device, communication device, or wireless transceiver. The first and second BSs may be unsynchronized or may be synchronized. As represented by step 520, a second observed time difference of arrival ("OTDOA2") value may be determined at a second MS between a third signal received from the first BS and a fourth signal received from the second BS. A first round trip time ("RTT1") value may be determined between the first MS and the first BS, and a second round trip time ("RTT2") value may be determined between the second MS and the second BS, as represented by steps 530 and 540, respectively. In step 550, a first initial location may be selected for the first MS that is within a first predetermined area and a second initial location for the second MS may be selected that is within a second predetermined area. A search algorithm may then be applied to fit applicable loci for the position of the first and second MSs as shown in step 560, using the selected initial locations, the OTDOA1 value, the OTDOA2 value, the RTT1 value, and the RTT2 value. In step 570 the result of this search algorithm generates a BSTO estimate. This BSTO estimate may be used to update a running best estimate (step 580) of the BSTO that is maintained at the location determining entity. If no previous best estimate exists, the current estimate is also the best running estimate. While the first predetermined area may be coextensive with an area served by the first BS, such an example should not limit the scope of the claims appended herewith. For example, the first predetermined area may be or include an area or region served by a neighboring BS. While the second predetermined area may be coextensive with an area served by the second BS, such an example should not limit the scope of the claims appended herewith. For example, the second predetermined area may be or include an area or region served by a neighboring BS. The iterative search algorithm may conduct any number or a predetermined number of steps. An exemplary algorithm may be, but is not limited to, a gradient search algorithm. As represented by step 590, the currently available best estimates for the BSTOs, the OTDOA values and the RTT values are used to compute the MS locations. In step 591, the first estimated location may be stored if the first estimated location is within a third predetermined area, and the second estimated location may also be stored if the second estimated location is within a fourth predetermined area. The first predetermined area may be the same as the third predetermined area, and the second predetermined area may be the same as the fourth predetermined area. As represented by step 592, the aforementioned steps, e.g., steps 510 through 591 may be repeated within a predetermined time interval or may be repeated as a function of another metric such as a fixed number of repetitions, etc. In a further embodiment of the present subject matter, the predetermined time interval may be a function of a BSTO drift value for a BSTO between the first and second BSs.

In an alternative embodiment, for each repetition of selecting an initial location of the first MS (step 550), the initial location may be selected at random within the first predetermined area. In another embodiment, for each repetition of selecting an initial location of the second MS (step 550), the initial location may be selected at random within the second predetermined area. In step 593, a first calculated location for the first MS and a second calculated location for the second MS may be determined from the stored estimated locations. Of course, any number of stored estimated locations may be utilized to produce the calculated locations. Further, the first and/or second calculated locations may be determined as an average of the stored first and/or second estimated locations, respectively, and may be determined using a measure of central tendency. Further embodiments of the present subject matter may determine the first and/or second calculated locations using a known mathematical process such as, but not limited to, average, weighted average, median, mode, midrange, and mean. In addition, the stored locations may be probabilistically weighted based on the probabilities of the initial locations used in each repetition of the sequence of steps. In this latter approach, a priori information, as detailed earlier, on each MS that limits its possible region of location may be used to generate such probabilities.

Figure 6:
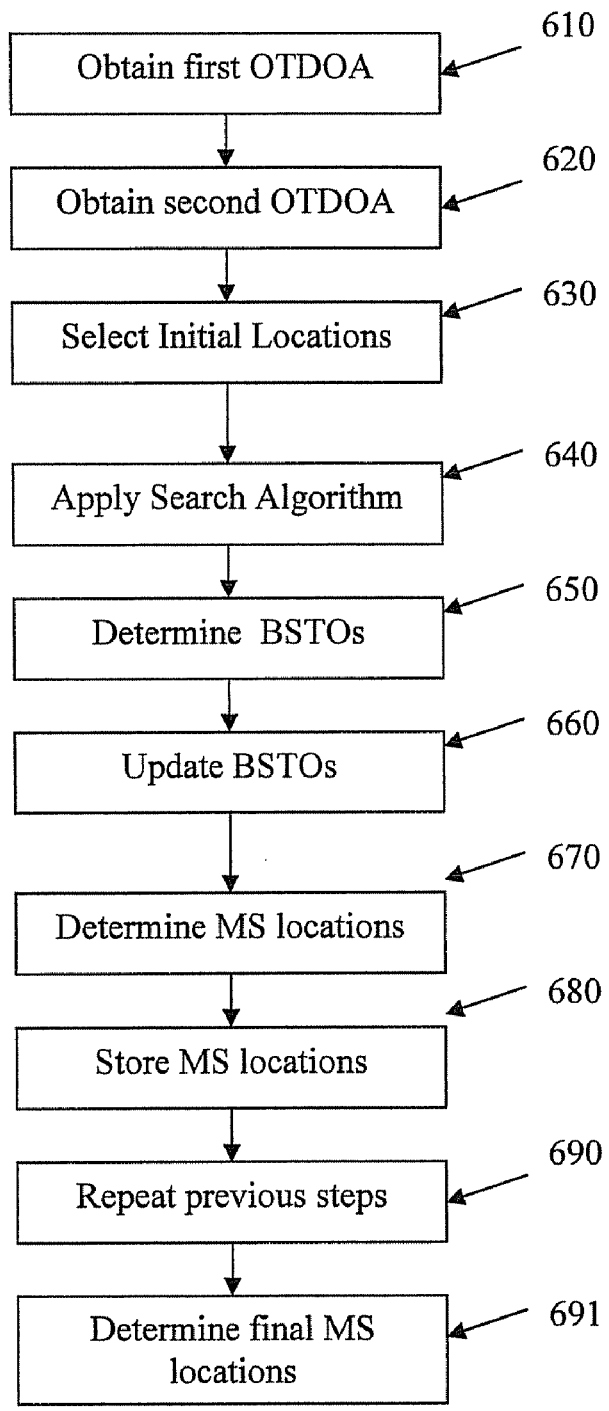
FIG. 6 is an algorithm according to an additional embodiment of the present subject matter.

FIG. 6 is an algorithm according to an additional embodiment of the present subject matter. With reference to FIG. 6, an OTDOA1 value is determined at a first MS between a first signal received from a first BS and a second signal received from a second BS in step 610. An exemplary MS may include a cellular telephone, text messaging device, computer, portable computer, vehicle locating device, vehicle security device, communication device, or wireless transceiver. The first and second BSs may be unsynchronized or may be synchronized. As represented by step 620, an OTDOA2 value may be determined at a second MS between a third signal received from the first BS and a fourth signal received from the second BS. In step 630, a first initial location may be selected for the first MS that is within a first predetermined area, and also a second initial location for the second MS may be selected that is within a second predetermined area. A search algorithm is then applied to fit applicable loci for the position of the MS as shown in step 640, using the selected initial locations, the OTDOA1 value and the OTDOA2 value. In step 650 the result of this search algorithm generates a BSTO estimate. This BSTO estimate may be used to update a running best estimate (step 660) of the BSTO that is maintained at the location determining entity. If no previous best estimate exists, the current estimate may also be the best running estimate. A first estimated location for the first MS and a second estimated location for the second MS may then be determined using the selected initial locations, the OTDOA1 value, the OTDOA2 value, and the running best estimate of the BSTO derived in step 660. While the first predetermined area may be coextensive with an area served by the first BS, such an example should not limit the scope of the claims appended herewith. For example, the first predetermined area may be or include an area or region served by a neighboring BS. While the second predetermined area may be coextensive with an area served by the second BS, such an example should not limit the scope of the claims appended herewith. For example, the second predetermined area may be or include an area or region served by a neighboring BS. The iterative search algorithm may conduct any number or a predetermined number of steps. An exemplary algorithm may be, but is not limited to, a gradient search algorithm. In step 680, the first estimated location may be stored if the first estimated location is within a third predetermined area, and also the second estimated location may be stored if the second estimated location is within a fourth predetermined area. The first predetermined area may be the same as the third predetermined area, and the second predetermined area may be the same as the fourth predetermined area. As represented by step 690, the aforementioned steps, e.g., steps 610 through 680 may be repeated within a predetermined time interval or may be repeated as a function of another metric such as a fixed number of repetitions, etc. In a further embodiment of the present subject matter, the predetermined time interval may be a function of a BSTO drift value for a BSTO between the first and second BSs.

In an alternative embodiment, for each repetition of selecting an initial location of the first MS (step 630), the initial location may be selected at random within the first predetermined area. In another embodiment, for each repetition of selecting an initial location of the second MS (step 630), the initial location may be selected at random within the second predetermined area. In step 691, a first calculated location for the first mobile and a second calculated location for the second MS may be determined from the stored estimated locations. Of course, any number of stored estimated locations may be utilized to produce the calculated locations. Further, the first and/or second calculated locations may be determined as an average of the stored first and/or second estimated locations, respectively, and may be determined using a measure of central tendency. Further embodiments of the present subject matter may determine the first and/or second calculated locations using a known mathematical process such as, but not limited to, average, weighted average, median, mode, midrange, and mean. In addition, the stored locations may be probabilistically weighted based on the probabilities of the initial locations used in each repetition of the sequence of steps. In this latter approach, a priori information, as detailed earlier, on each MS that limits its possible region of location may be used to generate such probabilites.

Figure 7:
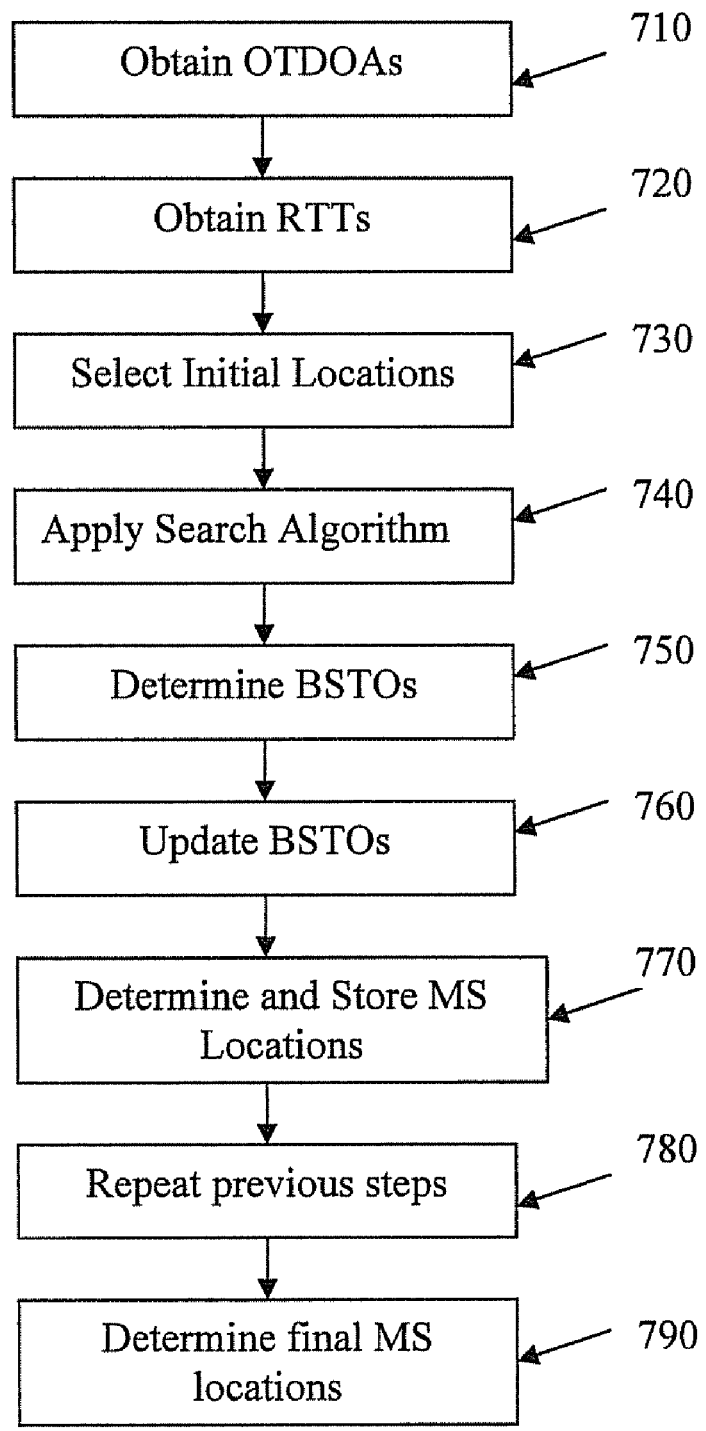
FIG. 7 is an algorithm according to an embodiment of the present subject matter.

FIG. 7 is an algorithm according to a further embodiment of the present subject matter. With reference to FIG. 7, in step 710, a set of OTDOA values may be determined at a number of MSs between signals received from pairs of BSs within a wireless network. An exemplary MS may include a cellular telephone, text messaging device, computer, portable computer, vehicle locating device, vehicle security device, communication device, or wireless transceiver. These BSs may be unsynchronized or may even be synchronized. Some of these MSs may have also obtained OTDOAs with respect to multiple pairs of BSs whereas other MSs may possess only one such OTDOA with respect to specific pair of BSs. In step 720, the MSs may obtain, where possible and or available, RTTs with respect to a subset of these BSs. In step 730, initial locations may be selected for each of the MSs so that they are within certain predetermined areas. These areas or regions may be selected by a variety of means including past history of MS locations, serving cell or sector, other mobile measurements obtained by the wireless network including but not limited to mobile power measurements reported, etc. A search algorithm may then be applied to fit applicable loci for the position of the MSs as shown in step 740, using the selected initial locations, the OTDOA values and the RTT values. In step 750 the result of this search algorithm may generate a set of BSTO estimate for all BSs that are relevant and applicable to the obtained measurements. These BSTO estimates are used to update a running best estimate (step 760) of the BSTOs that are maintained at the location determining entity. If no previous best estimate exists for any of the BSTOs, the current estimate may then also be the best running estimate for that particular BSTO. The iterative search algorithm may conduct any number or a predetermined number of steps. An exemplary algorithm may be, but is not limited to, a gradient search algorithm. In step 770, the currently available best estimates for the BSTOs, the OTDOA values and the RTT values are used to compute the MS locations. Also in step 770, the estimated locations may be stored if these estimated locations are within predetermined regions which may be identical to or different from the first set of regions used to define the initial locations. As represented by step 780, the aforementioned steps, e.g., steps 710 through 770 may be repeated within a predetermined time interval or may be repeated as a function of another metric such as a fixed number of repetitions, etc. In a further embodiment of the present subject matter, the predetermined time interval may be a function of a BSTO drift value for a BSTO between the relevant pair of BSs.

In an alternative embodiment, for each repetition of selecting an initial location MSs (step 730), the initial location may be selected at random within the first predetermined area. In step 790, a final calculated location for each of the MSs may be determined from the stored estimated locations. Of course, any number of stored estimated locations may be utilized to produce the calculated locations. Further, calculated locations may be determined as an average of the stored estimated locations, respectively, and may be determined using a measure of central tendency. Embodiments of the present subject matter may also determine the calculated locations using a known mathematical process such as, but not limited to, average, weighted average, median, mode, midrange, and mean. In addition, the stored locations may be probabilistically weighted based on the probabilities of the initial locations used in each repetition of the sequence of steps. In this latter approach, a priori information, as detailed earlier, on each MS that limits its possible region of location may be used to generate such probabilities.

It is thus an aspect of the present subject matter to eliminate the need for hardware location measurement units to be installed at BSs by solving for the BSTOs utilizing existing handset and network measurements. This makes utilizing handset OTDOAs and/or RTTs practical for MS location where a direct determination of the MS location is not possible due to under-determined equations.

It is also an aspect of the present subject matter to determine the location of MSs where the number of BSs and MSs present a data set of OTDOAs and RTTs such that the equations are fully determined. For example, if there exists three BSs and two MSs having all possible OTDOAs and an RTT for each MS with respect to its serving BS, the equations are sufficient for a solution. Thus, with a single data set it is possible to estimate the BSTOs and also determine the location of the MSs.

It is an additional aspect of the present subject matter to improve BSTO estimates by applying the randomization technique described above for the under-determined case. Additionally, through averaging BSTO estimates with randomized RTT values, the corresponding MS location estimate may also be improved.

As shown by the various configurations and embodiments illustrated in FIGS. 1-7, a system and method for estimating the location of a mobile device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating the location of a first mobile station from a plurality of mobile stations that receive signals from a plurality of base stations, comprising:
   (a) determining observed time difference of arrival ("OTDOA") values at said first mobile station and at a second mobile station between a first signal received from a first base station and a second signal received from a second base station;
   (b) determining a round trip time ("RTT") values between said first and second mobile stations and said first base station;
   (c) selecting an initial locations for said first and second mobile stations that are within a first and second predetermined areas, respectively;
   (d) determining an estimated base station time offset ("BSTO") using the selected initial locations, the OTDOA and RTT values, and an iterative search algorithm wherein the iterative search algorithm iterates a predetermined number of steps;
   (e) determining an estimated location for said first mobile station jointly with the BSTO;
   (f) storing said estimated location if the estimated location is within a third predetermined area;
   (g) repeating (a) through (f) within a predetermined time interval; and
   (h) determining a calculated location for said first mobile station from the stored estimated locations.

2. The method of claim 1 wherein determining an estimated BSTO further comprises:
   (i) determining a best estimate for the BSTO and updating said estimated BSTO with said best estimate;
   (ii) if no best estimate exists, then setting said estimated BSTO as the best estimate.

3. The method of claim 1 wherein said first and second base stations are not synchronized.

4. The method of claim 1 wherein for each repetition of (c) the initial location is selected at random within said first predetermined area.

5. The method of claim 1 wherein said first predetermined area is coextensive with an area served by said first base station.

6. The method of claim 1 wherein said first predetermined area and said third predetermined area are the same.

7. The method of claim 1 wherein said iterative search algorithm is a gradient search algorithm.

8. The method of claim 1 wherein said predetermined time interval is a function of a base station time offset drift value for a base station time offset between said first and second base stations.

9. The method of claim 1 wherein (a) through (f) are repeated a predetermined number of times rather than over a predetermined time interval.

10. The method of claim 1 wherein said calculated location is determined as an average of said stored estimated locations.

11. The method of claim 1 wherein said calculated location is determined using a measure of central tendency.

12. The method of claim 1 wherein said calculated location is determined using a mathematical process selected from the group consisting of: average, weighted average, median, mode, midrange, and mean.

13. The method of claim 1 wherein said mobile station is selected from the group consisting of: cellular telephone, text messaging device, computer, portable computer, vehicle locating device, vehicle security device, communication device, and wireless transceiver.

14. A method for estimating the location of a first mobile station and a second mobile station where each mobile station receives signals from the same plurality of base stations, comprising:
   (a) determining a first observed time difference of arrival ("OTDOA1") value at said first mobile station between a first signal received from a first base station and a second signal received from a second base station;
   (b) determining a second observed time difference of arrival ("OTDOA2") value at said second mobile station between a third signal received from said first base station and a fourth signal received from said second base station;
   (c) determining a first round trip time ("RTT1") value between said first mobile station and said first base station;
   (d) determining a second round trip time ("RTT2") value between said second mobile station and said second base station;
   (e) selecting a first initial location for said first mobile station that is within a first predetermined area;
   (f) selecting a second initial location for said second mobile station that is within a second predetermined area;
   (g) determining an estimated base station time offset ("BSTO") using the selected initial locations, the OTDOA1 value, the OTDOA2 value, the RTT1 value, the RTT2 value, and an iterative search algorithm wherein the iterative search algorithm iterates a predetermined number of steps;
   (h) determining a first estimated location for said first mobile station and a second estimated location for said second mobile station jointly with the BSTO;
   (i) storing the first estimated location if said first estimated location is within a third predetermined area;
   (j) storing the second estimated location if said second estimated location is within a fourth predetermined area;
   (k) repeating (a) through (j) within a predetermined time interval; and
   (l) determining a first calculated location for said first mobile station and a second calculated location for said second mobile station from the stored estimated locations.

15. The method of claim 14 wherein determining an estimated BSTO further comprises:
   (i) determining a best estimate for the BSTO and updating said estimated BSTO with said best estimate;
   (ii) if no best estimate exists, then setting said estimated BSTO as the best estimate.

16. The method of claim 14 wherein said first and second base stations are not synchronized.

17. The method of claim 14 wherein for each repetition of (e) the initial location of said first mobile station is selected at random within said first predetermined area.

18. The method of claim 14 wherein for each repetition of (f) the initial location of said second mobile station is selected at random within said second predetermined area.

19. The method of claim 14 wherein said first predetermined area is coextensive with an area served by said first base station.

20. The method of claim 14 wherein said second predetermined area is coextensive with an area served by said second base station.

21. The method of claim 14 wherein said first predetermined area and said third predetermined area are the same.

22. The method of claim 14 wherein said second predetermined area and said fourth predetermined area are the same.

23. The method of claim 14 wherein said iterative search algorithm is a gradient search algorithm.

24. The method of claim 14 wherein said predetermined time interval is a function of a base station time offset drift value for a base station time offset between said first and second base stations.

25. The method of claim 14 wherein (a) through (j) are repeated a predetermined number of times rather than over a predetermined time interval.

26. The method of claim 14 wherein at least one of said first calculated location is determined as an average of said stored first estimated locations.

27. The method of claim 14 wherein said second calculated location is determined as an average of said stored second estimated locations.

28. The method of claim 14 wherein at least one of said first calculated location and said second calculated location is determined using a measure of central tendency.

29. The method of claim 14 wherein at least one of said first calculated location and said second calculated location is determined using a mathematical process selected from the group consisting of: average, weighted average, median, mode, midrange, and mean.

30. The method of claim 14 wherein at least one of said first mobile station and said second mobile station is selected from the group consisting of: cellular telephone, text messaging device, computer, portable computer, vehicle locating device, vehicle security device, communication device, and wireless transceiver.

31. A method for estimating the location of a first mobile station and a second mobile station where each mobile station receives signals from the same plurality of base stations, comprising:
   (a) determining a first observed time difference of arrival ("OTDOA1") value at said first mobile station between a first signal received from a first base station and a second signal received from a second base station;
   (b) determining a second observed time difference of arrival ("OTDOA2") value at said second mobile station between a third signal received from said first base station and a fourth signal received from said second base station;
   (c) selecting a first initial location for said first mobile station that is within a first predetermined area;
   (d) selecting a second initial location for said second mobile station that is within a second predetermined area;
   (e) determining an estimated base station time offset ("BSTO") using the selected initial locations, the OTDOA1 value, the OTDOA2 value, and an iterative search algorithm wherein the iterative search algorithm iterates a predetermined number of steps;
   (f) determining a first estimated location for said first mobile station and a second estimated location for said second mobile station jointly with the BSTO;
   (g) storing the first estimated location if said first estimated location is within a third predetermined area;

(h) storing the second estimated location if said second estimated location is within a fourth predetermined area;

(i) repeating (a) through (h) within a predetermined time interval; and (j) determining a first calculated location for said first mobile station and a second calculated location for said second mobile station from the stored estimated locations.

32. The method of claim 31 wherein determining an estimated BSTO further comprises:

(i) determining a best estimate for the BSTO and updating said estimated BSTO with said best estimate;

(ii) if no best estimate exists, then setting said estimated BSTO as the best estimate.

33. The method of claim 31 wherein said first and second base stations are not synchronized.

34. The method of claim 31 wherein for each repetition of (c) the initial location of said first mobile station is selected at random within said first predetermined area.

35. The method of claim 31 wherein for each repetition of (d) the initial location of said second mobile station is selected at random within said second predetermined area.

36. The method of claim 31 wherein said first predetermined area is coextensive with an area served by said first base station.

37. The method of claim 31 wherein said second predetermined area is coextensive with an area served by said second base station.

38. The method of claim 31 wherein said first predetermined area and said third predetermined area are the same.

39. The method of claim 31 wherein said second predetermined area and said fourth predetermined area are the same.

40. The method of claim 31 wherein said iterative search algorithm is a gradient search algorithm.

41. The method of claim 31 wherein said predetermined time interval is a function of a base station time offset drift value for a base station time offset between said first and second base stations.

42. The method of claim 31 wherein (a) through (h) are repeated a predetermined number of times rather than over a predetermined time interval.

43. The method of claim 31 wherein at least one of said first calculated location is determined as an average of said stored first estimated locations.

44. The method of claim 31 wherein said second calculated location is determined as an average of said stored second estimated locations.

45. The method of claim 31 wherein at least one of said first calculated location and said second calculated location is determined using a measure of central tendency.

46. The method of claim 31 wherein at least one of said first calculated location and said second calculated location is determined using a mathematical process selected from the group consisting of: average, weighted average, median, mode, midrange, and mean.

47. The method of claim 31 wherein at least one of said first mobile station and said second mobile station is selected from the group consisting of: cellular telephone, text messaging device, computer, portable computer, vehicle locating device, vehicle security device, communication device, and wireless transceiver.

* * * * *